Oct. 19, 1954    L. M. KRAUSE    2,691,863
SICKLE DRIVE

Filed Nov. 4, 1953    2 Sheets-Sheet 1

INVENTOR.
L. M. KRAUSE
BY
James E. Nilles
ATT'Y

Oct. 19, 1954  L. M. KRAUSE  2,691,863
SICKLE DRIVE
Filed Nov. 4, 1953  2 Sheets-Sheet 2
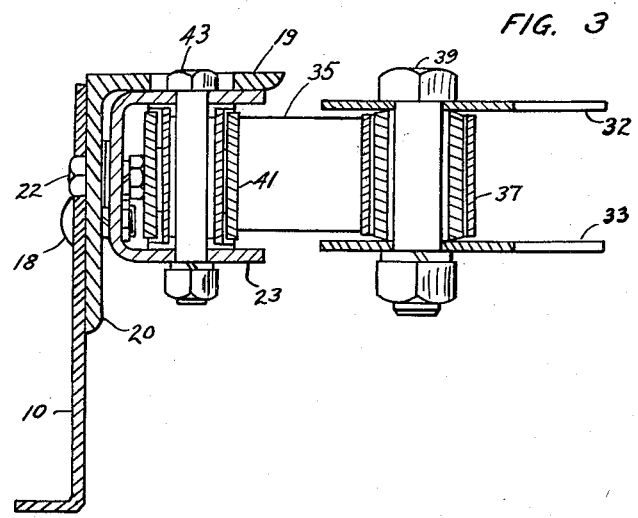
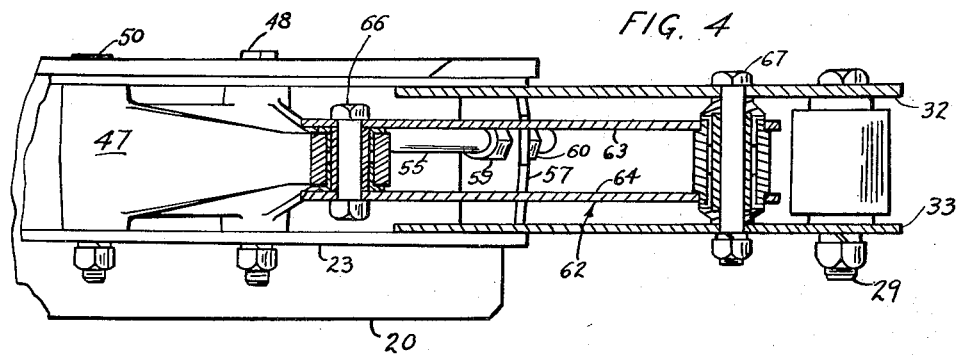
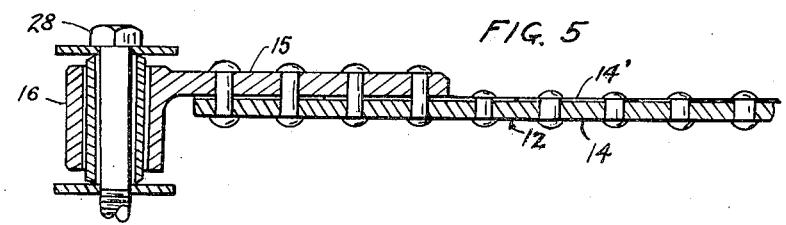
INVENTOR.
L. M. KRAUSE
BY
James E. Nilles
ATT'Y Patented Oct. 19, 1954

2,691,863

UNITED STATES PATENT OFFICE 2,691,863

SICKLE DRIVE

Leonard M. Krause, Willowdale, Ontario, Canada, assignor to Massey-Harris Co., Ltd., Toronto, Ontario, Canada, a corporation of Canada Application November 4, 1953, Serial No. 390,148

6 Claims. (Cl. 56—296)

This invention relates to agricultural machines and, more particularly, to the drive for operating the reciprocating knife, commonly referred to as a sickle, which severs the crop from the ground.

One of the principal factors limiting the speed at which the tractor or other implement can be operated while harvesting a crop is the speed at which the reciprocating knife can be operated. With the advent of increased crop harvesting speeds, much attention is being given to the problem of increasing the knife speed and reducing vibration and twisting moments which occur in a high speed drive of this type. It is to this problem that this invention is directed.

One means, commonly used in machines of this type, for converting oscillatory motion into reciprocating motion at the knife end is by a simple sway bar which is pivotally mounted in the center to the machine frame and driven at one end by a conventional pitman while the other end of the bar is attached to the reciprocating knife. In the usual case such devices employ only a relatively short stroke of the knife of approximately three inches. It is obvious, however, that a longer stroke is desirable which allows the number of oscillations of the sway bar to be substantially reduced over one with a shorter stroke and still obtain the same knife speed, or, with the same number of oscillations, greatly increase the knife speed.

In one form of conventional knife drive, the angular movement of the forward end of the sway bar is compensated for by simply allowing the forward end of the sway bar to slide between two rollers which are secured to the knife. This connection, however, tends to wear and requires frequent aligning. Furthermore, the noise inherent in prior art drive devices is very objectionable.

In other conventional drives, rubber bushings have been provided in the pivotal connection between the end of the sway bar and the knife; the bushing in this case absorbing the angular deflection of the sway bar which, in the case of a short stroke is, obviously, negligible.

It is one object of this invention to provide a simple knife drive which requires little attention in order to keep it properly aligned and which is highly efficient in performing the functions for which it is designed.

It is a more specific object of this invention to provide a sway bar for a reciprocating knife which is pivotally mounted in relation to the supporting structure and having means which allows the point of said pivotal connection to oscillate slightly in a direction approximately normal to the direction in which the knife reciprocates, thereby permitting a long stroke of the knife by eliminating the arcuate movement of the knife end of the sway bar.

It is a broad object of this invention to generally improve knife drives.

It is an object of this invention to improve the construction of a sway bar for a reciprocating knife cutting device.

It is an object of this invention to provide a reciprocating knife drive wherein the centers of gravity of the pitman, knife, sway bar and interconnecting members are in the same horizontal plane providing a balanced drive arrangement that eliminates twisting moments.

These and other objects and advantages of this invention will become more apparent as this disclosure progresses, reference being had to the accompanying drawings in which:

Figure 3 is a sectional view, on an enlarged scale, taken on line 3—3 of Figure 1.

Figure 4 is a sectional view, on an enlarged scale, taken on line 4—4 of Figure 1.

Figure 5 is a sectional view, on an enlarged scale, taken on line 5—5 of Figure 1.

Figure 1:
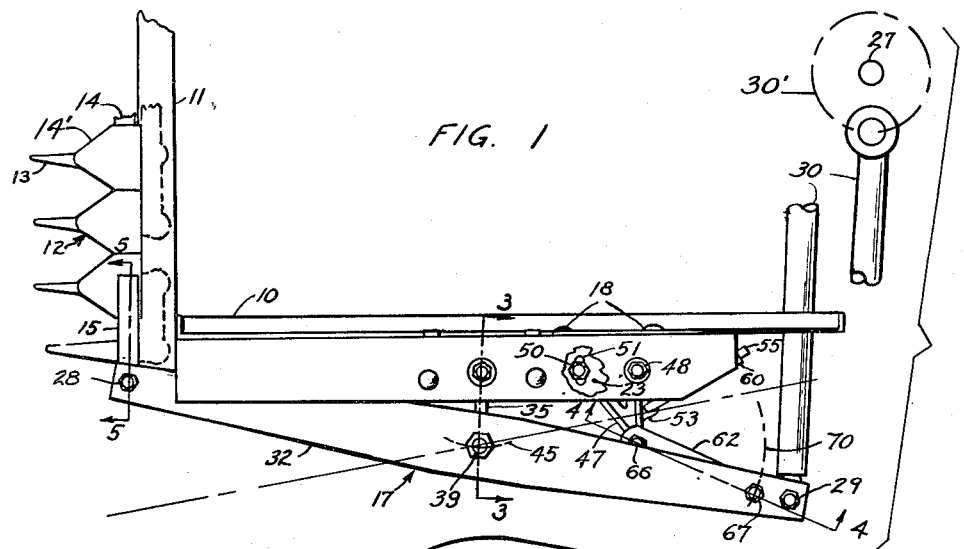
Figure 1 is a plan view with parts broken away of my sickle drive.

Referring more particularly to the drawings, the embodiment I have shown is in connection with a combine harvester, only the left end 10 of the harvesting table being shown, to which is attached my improved knife drive. It is understood, of course, that this invention is equally applicable to other types of harvesting machines. Along the forward edge of the harvesting table is secured an angle iron 11 on which is supported for reciprocatory movement the conventional knife 12 (Fig. 1) comprised of bar 14 to which are riveted knife sections 14'. The usual sickle guards 13 are secured to the angle 11. Secured to the end of the knife is member 15 which has at its end a bearing 16 for connection to the sway bar 17. Secured along the outer end of the harvesting table end 10 by means of bolts 18 is an angular member 19 having a vertically disposed flange 20. Secured to the vertical flange of the angle 19 by means of bolts 22 is a channel shaped member 23 having its legs disposed in a horizontal position. This structure forms a rigid support for the knife drive to be described.

Figure 2:
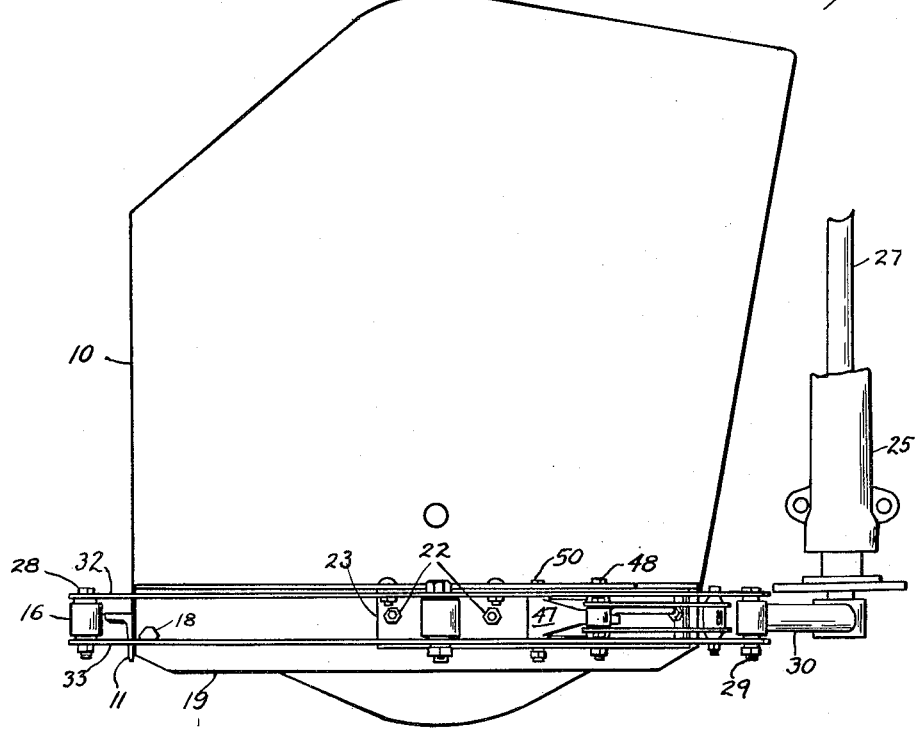
Figure 2 is a side elevational view of the device shown in Figure 1.

Referring to Fig. 2, a support bearing 25 is secured to the harvesting table in which is rotatably mounted a drive shaft 27 which receives its power from a power source not shown. At the lower end of shaft 27 is the conventional crank wheel 30' and pitman 30 for converting oscillatory motion into reciprocating motion. Between the pitman 30 and the knife 12 is the sway bar 17 comprised of two horizontally disposed parallel plate members 32, 33 which are pivotally connected to the pitman and knife by means of bolts 29, 28 respectively. The sway bar 17 is connected to the channel member 23 by arm 35 (Fig. 3) having at its outer end a bearing 37 for pivotal connection, by means of bolt 39, to the sway bar 17 and at its inner end has a bearing 41 for pivotal connection, by means of bolts 43, to the channel member 23. These bearings are so constructed so as to allow no looseness between the interconnecting parts other than a pivotal movement. By means of the arm 35, the sway bar 17, at its point of pivotal connection 39, can be pivoted relative to the table in the conventional manner and can also be moved slightly in a substantially longitudinal direction to the table end as shown by the dotted arc line 45.

The means to cause this longitudinal shifting of the sway bar, within predetermined and adjustable limits, and thereby allow the knife to travel in a straight line, is as follows. A triangular shaped bracket 47 (Figs. 1 and 4) is secured by means of bolt and nut 48 between the legs of channel member 23. Another corner of the triangular bracket is adjustably secured to channel member 23 by bolt 50, which is positionable in slots 51 in channel member 23. Along one leg of the triangular shaped bracket is a lug 53 having therein an aperture for the reception of the adjusting rod 55, the rear end of which extends through an opening in brace 57 and is adjustably secured thereto by nuts 59, 60. Brace 57 is welded to channel member 23. By means of this adjusting rod the bearing 16, at the forward end of sway bar 17, can be accurately aligned with the knife 12 as will more fully appear hereinafter. The sway bar 17 is pivotally connected with the triangular bracket 47 by the guide link 62. Guide link 62 comprises two parallel plates 63, 64 connected at either end to bracket 47 and sway bar 17 by means of bolts 66, 67 respectively. Suitable bearings are provided (as shown in Figure 4) for the connection of guide link 62 to the bracket 47 and sway bar 17 which allow no looseness other than their intended pivotal movement. The device as illustrated is, of course, but one embodiment of the invention.

Due to the novel construction of the sway bar itself, it will be noted that the centers of gravity of the pitman 30, sway bar 17, triangular bracket 47, guide link 62, arm 35, and the knife itself all lie in a common horizontal plane. Thus there are not twisting stresses set up which are of considerable magnitude when operating at high speeds.

In operation as the shaft 27 is driven and the pitman 30 reciprocates, the point 67 will move in a path described by the arc 70 (Fig. 1) as determined by the oscillation of guide link 62 about the bolt, or point, 66. As previously mentioned this point 66 can be adjusted by means of the adjusting rod 55 after the locking bolt and nut 50 have been loosened so as to slide in slots 51. The position of point 66 determines the extent of movement of the bearing 16 at the forward end of the sway bar 17 in a longitudinal direction and in this manner correct alignment of the knife can quickly be obtained which not only facilitates assembly but compensates for wear of these parts after use.

As the sway bar is oscillated about the point, or bolt 39, the point 39 is moved very slightly in an arcuate path as described by the line 45, previously mentioned. When the forward end of the sway bar 17 is at either end of its stroke therefore, the point 39 will be in its most forward position due to the fact that point 67 will have reached its most forward position. With this mechanism therefore, there is provided a very desirable type of movement of the sway bar for converting rotary motion into reciprocating motion of the knife.

Having thus shown and described my invention, I claim:

1. In combination with a supporting structure adapted to be moved over the ground, a reciprocable knife mounted on said structure, an arm pivotally connected at one end of said structure, a sway bar pivotally connected intermediate its ends to the other end of said arm and pivotally connected at one of its ends to said knife, a pitman carried by said supporting structure and pivotally connected to the other end of said sway bar, a bracket secured to said supporting structure, a guide link pivotally secured to said bracket and to said sway bar.

2. A device as set forth in claim 1 further characterized in that; said sway bar comprises two vertically spaced, horizontally disposed, parallel plate members having its pivotal connections to the knife, arm, guide link and pitman between said plate members.

3. In an agricultural machine having a supporting structure adapted to be moved over the crop being worked, a reciprocable knife mounted along the forward edge of said structure, a pitman carried by said structure, a sway bar pivotally connected at its forward end to said knife and at its rearward end with said pitman, the improvement comprising; an arm pivotally connected to said structure and to said sway bar intermediate its length, a link pivotally connected adjacent the rear end of said sway bar and having a pivotal connection with said structure.

4. A device as defined in claim 3 further characterized in that said pivotal connection between said link and said structure comprises; a bracket adjustably and fixedly secured to said structure, said link being pivotally connected to said bracket.

5. In an agricultural machine for cutting a crop over which it traverses and having a supporting structure, the combination comprising; a reciprocable knife mounted on said structure, a pitman carried by said structure, a sway bar pivotally connected at one end to said knife and at the other end with said pitman, an arm pivotally connected to said structure and to said sway bar intermediate its length whereby said sway bar is longitudinally shiftable, a guide link pivotally connected to said sway bar and having a pivotal connection with said structure whereby longitudinal shifting of said sway bar will occur as said pitman oscillates it.

6. A device as recited in claim 5 further defined in that said pivotal connection between said link and said structure comprises, a bracket secured to said structure, said guide link being pivotally attached to said bracket.

References Cited in the file of this patent

UNITED STATES PATENTS

| Number | Name | Date |
| --- | --- | --- |
| 310,316 | Reams | Jan. 6, 1885 |
| 384,025 | Davis | June 5, 1888 |
| 1,280,373 | Beckner | Oct. 1, 1918 |
| 1,335,266 | Zander | Mar. 30, 1920 |
| 2,599,438 | Downing et al. | June 3, 1952 |
| 2,629,219 | Holley | Feb. 24, 1953 |